Figure 1:
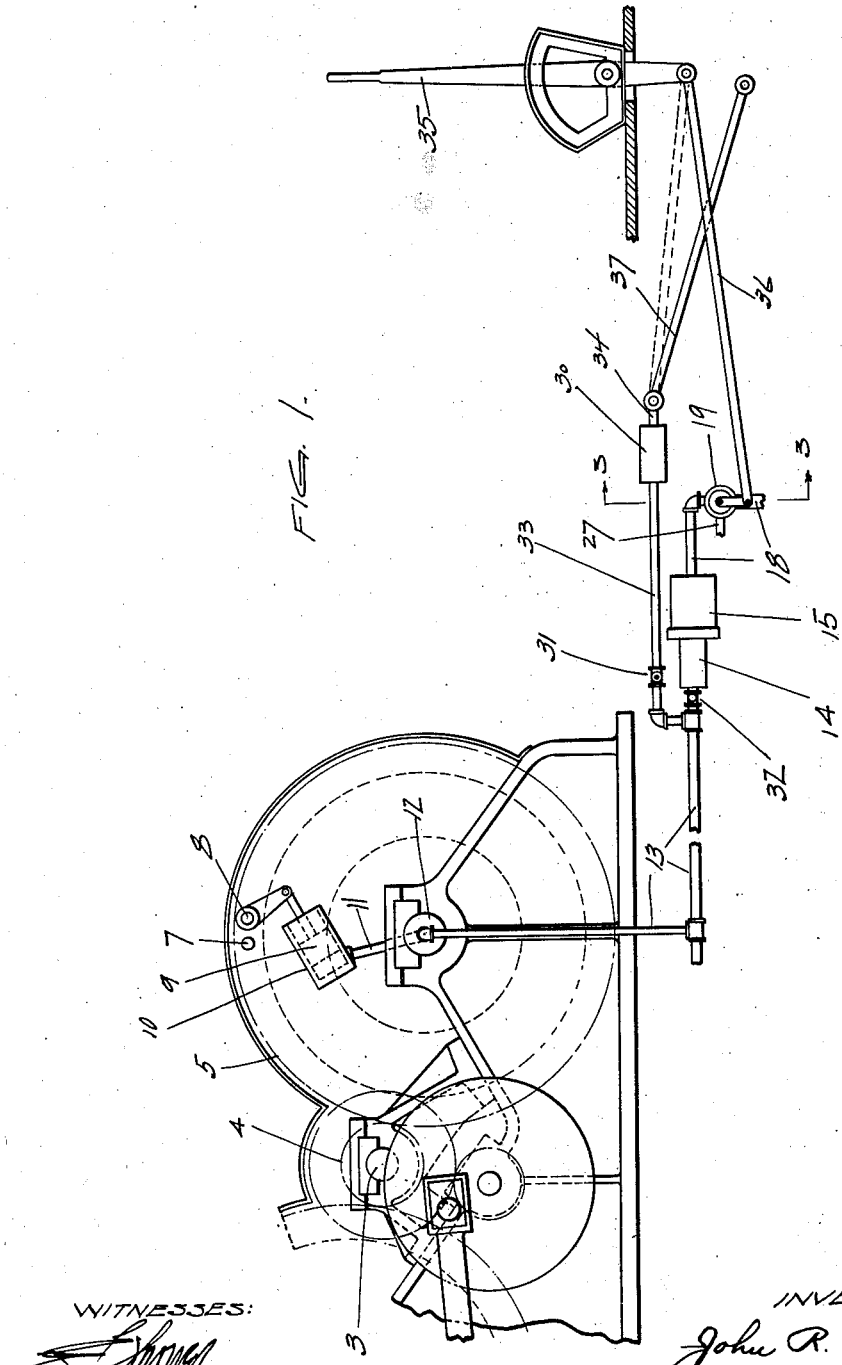

J. R. McGIFFERT.
FLUID OPERATED CLUTCH.
APPLICATION FILED MAR. 30, 1911.

1,027,493.

Patented May 28, 1912.
2 SHEETS—SHEET 1.

WITNESSES:

INVENTOR
John R. McGiffert
BY
J. B. Fay
ATTORNEY

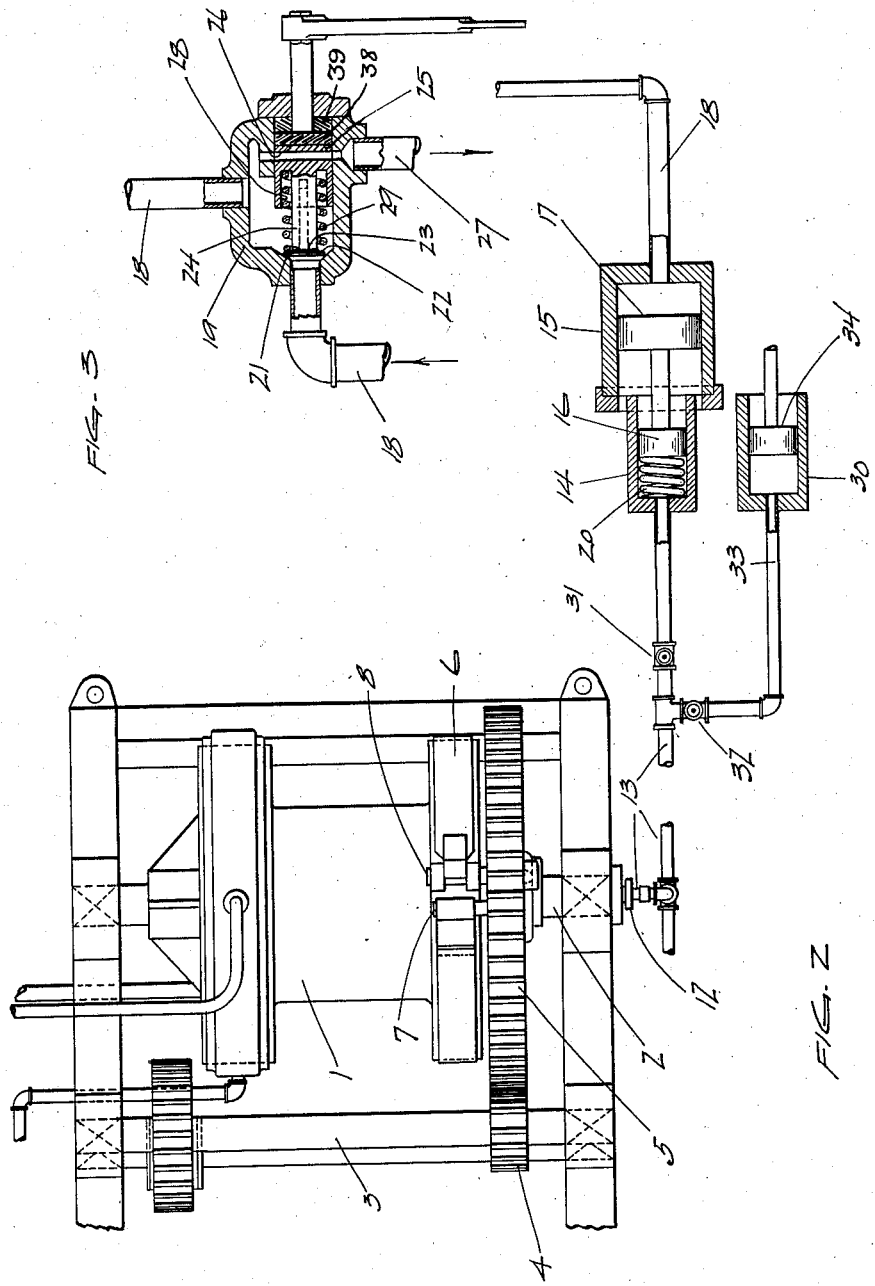

UNITED STATES PATENT OFFICE.

JOHN R. McGIFFERT, OF DULUTH, MINNESOTA, ASSIGNOR TO CLYDE IRON WORKS, OF DULUTH, MINNESOTA, A CORPORATION OF MAINE.

FLUID-OPERATED CLUTCH.

1,027,493.   Specification of Letters Patent.   Patented May 28, 1912.

Application filed March 30, 1911. Serial No. 617,815.

*To all whom it may concern:*

Be it known that I, JOHN R. MCGIFFERT, a citizen of the United States, and a resident of Duluth, county of St. Louis, and State of Minnesota, have invented a new and useful Improvement in Fluid-Operated Clutches, of which the following is a specification, the principle of the invention being herein explained and the best mode in which I have contemplated applying that principle, so as to distinguish it from other inventions.

Where a very considerable power is required to be applied to operate a hoisting drum or the like, fluid actuated clutches for non-rotatably securing the drums to their respective shafts or equivalent driving members, have been found desirable. Not only is such a clutch more effective than the usual hand-operated clutch of the friction type, but operation can obviously be secured from a station more or less removed, as is frequently desirable in hoisting plants, whether of the stationary type or not.

The object of the present invention is the provision of an improved fluid-pressure clutch whereby particularly such operation from a distance may be more effectively secured.

To the accomplishment of this and related objects, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a side elevation of a hoisting drum and clutch for driving the same together with the fluid pressure connections to the latter; Fig. 2 is a plan view of such drum and clutch with part of the aforesaid connections shown in section; and Fig. 3 is a sectional view of a control valve that is interposed in said connections.

As ordinarily used in a hoisting plant a plurality of drums are provided for operating the various lines required to be used. But a single such drum 1, however, is shown in the general assembly found in Figs. 1 and 2 of the drawings just described, as amply illustrating the parts of present interest. Said drum is shown as normally rotatable upon its shaft 2, which may be either the crank-shaft to which the power of the engine is directly applied or else a secondary shaft depending on circumstances. As illustrated the drum-shaft is designed to be driven from a second shaft 3 which is located adjacent to the engine crank-shaft, the driving connection including a pinion 4 on such one shaft and a gear 5 on the other. To secure such drum onto the shaft when it is desired to rotate it, suitable friction clutch mechanism is employed, consisting specifically of a friction band 6 fixedly secured at one end to the gear 5 upon a pin 7 parallel with said gear's axis; while the other end of the band is secured to a rocker 8 carried by said gear and adapted to be oscillated by means of a piston 9 working in a cylinder 10 suitably attached to the face of the gear. The actuating pressure-fluid, assumed in the present case to be steam, is supplied to said cylinder through a pipe 11 that extends down to the center of the drum shaft and thence out through such shaft to its end, where rotatable connection is had by means of a gland 12 with a fixed line 13. Interposed at a suitable point in this line is a cylinder comprising two portions 14 and 15 of different diameters within which are reciprocably held corresponding pistons 16 and 17, which are however connected with each other, so that force applied against the one will move the other. The larger cylinder-portion 15 is connected with a steam supply line 18 preferably controlled by a valve 19 of the construction shown in section, and on an enlarged scale, in Fig. 3; while the portion of the pipe lying beyond the smaller cylinder portion is filled with oil, or an equivalent relatively incompressible liquid. A spring 20 in such oil cylinder normally retracts the piston, when the steam is exhausted, so as to suck back the oil in the pipe line 12 and thus actuate piston 9 to release the clutch band 6; but upon admission of steam to the steam cylinder such spring is compressed and the oil forced through the line in question so as to actuate said piston to contract said clutch band and thus secure the drum to the gear.

The valve 19 for controlling the supply of steam to the steam cylinder 15 has the bore of the opening in the valve casing or body, with which the supply pipe is connected, formed with a seat 21 against which a valve 22 of the puppet type is adapted to fit. The shank 23 of said valve is freely reciprocably held in a stem 24 that is threaded in the end of the valve body opposite to the inlet opening just referred to, such end consisting of a removable plate to permit the assembly of the parts and their separation when occasion demands. To the outer end of this stem is attached a lever or similar means for rotating the same when it is desired to operate the valve.

For part of its length, the stem 24 is provided with a cylindrical enlargement 25 that is closely fitted in a corresponding bore in the adjacent portion of the valve body; the rear end of the enlargement 25 is threaded as at 38, while the valve body is correspondingly threaded as at 39. These threads are very steep so that practically a quarter turn of the stem will retract or advance it the full desired distance. The enlargement 25 is provided with a transverse passage 26 adapted to register with ports in the valve body and to thereupon open communication between the interior of the body and the exhaust line 27, which position is shown in Fig. 3. Upon rotation from this position the passage 26 is thrown out of register with the ports in question and the exhaust closed. The stem enlargement 25 is furthermore formed with a recess 28 surrounding the portion of the stem of smaller diameter, and in this recess is seated one end of a compression spring 29, the other end of which presses against the rear face of the valve 22.

In the inner position of the stem 24 illustrated in Fig. 3 just referred to, not only is the transverse passage 26 in the enlarged portion of said stem, disposed so as to permit any pressure within the valve body and the connecting stem cylinder, to be relieved, but the valve 22, is placed under sufficient pressure to maintain the latter on its seat against the steam pressure supplied through line 18. If, however, the lever 25 be rotated so as to slightly retract the stem, the exhaust port is immediately closed, even though the spring be still held under such tension as to retain the valve closed; while upon still further retraction, such spring tension will be relieved to permit the valve to partially open, that is it will open until such a pressure is built up within the valve casing, and the cylinder as to equal, when added to the remaining tension of this spring, the pressure of the steam in the supply pipe. By adjusting the stem to various positions, the pressure of the steam passing through the valve may be readily regulated from zero up to the full pressure of the boiler, this pressure being determined, of course, by the position of the lever, which in turn positions said stem.

Whatever the pressure of the steam that is admitted to the steam cylinder 15, a corresponding pressure will, of course, be transmitted to the oil in the oil-cylinder 14 and the pipe line 13 leading therefrom to the actuating cylinder 10. The piston pressing against the oil is somewhat removed from the steam piston so as to prevent the steam from improperly heating the oil, which would be objectionable.

In addition to the combined steam and oil cylinder just referred to, yet another cylinder 30 is shown in Figs. 1 and 2 as being adapted to be connected with the oil line 13, valves 31 and 32 being placed one in the branch 33 of said line leading to said cylinder, and the other between the point of juncture of this branch and the one to the steam and oil cylinder, so as to permit either cylinder to be optionally thus connected, as may be required. In this second cylinder is a piston 34 designed to be directly hand operated, when for any reason it becomes necessary to thus apply the oil pressure to the actuating cylinder, a hand lever 35 being utilized to operate said piston or the lever of the controlling valve 19, as occasion may demand. The rod 36 from said lever 35 to the valve-lever will of course be disconnected and a corresponding rod 37 connected with the piston 34 when it is desired thus to manually operate the clutch, just the opposite connections prevailing when steam pressure instead is being used. In either case it will be observed that the clutch may be operated from a station removed at any suitable distance. Ordinarily, of course, the steam will be used and the arrangement for utilizing the same is particularly commended. A considerable advantage lies in having the spring for releasing the clutch included in the oil cylinder 14 at the farther end of pipe line 13, instead of attaching such spring, which is relatively heavy, to the gear 5 where it would be more or less in the way. In the second place, by thus locating said spring it does not reduce the effective pressure of the fluid, that is the oil in said pipe line 13. This latter feature has the advantage that the pipe connections will be less likely to leak, since the necessary working pressure in the pipe will be reduced by the amount of the spring tension. Such spring of course, does require additional steam pressure to overcome its resistance, but this is not of particular importance as the steam cylinder 15 may be more readily packed, and it exhausts to the atmosphere, moreover, at each operation of the clutch. Such steam pressure, however, in no event requires to be greater than where, as in prevailing constructions, the spring for relieving the pressure on the actuating piston has been directly connected therewith; while compression of said spring in the present construction precedes the application of pressure upon the oil or other pressure-conveying medium.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the class described, the combination with driving and driven members and fluid-pressure actuated clutch-means adapted to operatively connect said members; of means for applying fluid-pressure to said clutch-means, said pressure-applying-means including a cylinder connected at one end with said clutch-means, the connections between said cylinder and clutch-means being filled with a relatively incompressible fluid; a piston in said cylinder; means normally retracting said piston to relieve the pressure on the fluid in such connections; external fluid-pressure supply connections to the other end of said cylinder; and a regulating valve for controlling said supply connections.

2. In mechanism of the class described, the combination with driving and driven members and fluid-pressure actuated clutch means adapted to operatively connect said members; of means for applying fluid-pressure to said clutch-means, said pressure-applying-means including a cylinder connected at one end with said clutch-means, the connections between said cylinder and clutch-means being filled with a relatively incompressible fluid; a piston in said cylinder; resilient means directly connected with said piston tending to retract the same and thereby relieve the pressure on the fluid in such connections; external fluid-pressure supply connections to the other end of said cylinder; and a regulating valve for controlling said supply connections.

3. In mechanism of the class described, the combination with driving and driven members and fluid-pressure actuated clutch-means adapted to operatively connect said members; of means for applying fluid-pressure to said clutch-means, said pressure-applying-means including a cylinder connected at one end with said clutch-means, the connections between said cylinder and clutch-means being filled with a relatively incompressible fluid; two spaced pistons in said cylinder, said pistons being connected to move in unison; resilient means directly connected with one of said pistons and tending to retract the same and thereby relieve the pressure on the fluid in such connections; external fluid-pressure supply connections to the other end of said cylinder; and a regulating valve for controlling said supply connections.

4. In mechanism of the class described, the combination with driving and driven members and fluid-pressure actuated clutch means adapted to operatively connect said members; of means for applying fluid-pressure to said clutch means, said pressure-applying means including a cylinder having two portions of unlike diameters, the portion of smaller diameter being connected with said clutch means and the connections between such portion and means being filled with a relatively incompressible fluid; two pistons in the respective portions of said cylinder, said pistons being connected to move in unison; external fluid-pressure supply connections to the larger end of said cylinder; and a regulating valve for controlling said supply connections.

5. In mechanism of the class described, the combination with driving and driven members and fluid-pressure actuated clutch means adapted to operatively connect said members; of means for applying fluid-pressure to said clutch means, said pressure-applying means including a cylinder having two portions of unlike diameters, the portion of smaller diameter being connected with said clutch means and the connections between such portion and means being filled with a relatively incompressible fluid; two pistons in the respective portions of said cylinder, said pistons being connected to move in unison; means normally retracting said pistons to relieve the pressure on the fluid in such connections; external fluid-pressure supply connections to the larger end of said cylinder; and a regulating valve for controlling said supply connections.

6. In mechanism of the class described, the combination with driving and driven members and fluid-pressure actuated clutch means adapted to operatively connect said members; of means for applying fluid-pressure to said clutch means, said pressure-applying means including a cylinder having two portions of unlike diameters, the portion of smaller diameter being connected with said clutch means and the connections between such portion and means being filled with a relatively incompressible fluid; two pistons in the respective position of said cylinder, said pistons being connected to move in unison; a compression spring in the smaller portion of said cylinder, said spring bearing against the corresponding piston and tending to retract the same and thereby relieve the pressure on the fluid in such connection; external fluid-pressure supply connections to the larger end of said cylinder; and a regulating valve for controlling said supply connections.

7. In mechanism of the class described, the combination with driving and driven members and fluid-pressure actuated clutch means adapted to operatively connect said members; of means for applying fluid-pressure to said clutch means, said pressure-applying means including a cylinder connected at one end with said clutch-means, the connections between said cylinder and clutch-means being filled with a relatively incompressible fluid; a piston in said cylinder; external fluid-pressure supply connections to the other end of said cylinder; and a second, independent cylinder and piston connected to apply pressure to said clutch-means.

8. In mechanism of the class described, the combination with driving and driven members and fluid-pressure actuated clutch means adapted to operatively connect said members; of means for applying fluid-pressure to said clutch means, said pressure-applying means including a cylinder connected at one end with said clutch-means, the connections between said cylinder and clutch-means being filled with a relatively incompressible fluid; a piston in said cylinder; external fluid-pressure supply connections to the other end of said cylinder; a second, independent cylinder and piston connected to apply pressure to said clutch-means; and means for manually operating the piston in said second cylinder.

9. In mechanism of the class described, the combination with driving and driven members and fluid-pressure actuated clutch means adapted to operatively connect said members; of means for applying fluid-pressure to said clutch means, said pressure-applying means including a cylinder connected at one end with said clutch-means, the connections between said cylinder and clutch-means being filled with a relatively incompressible fluid; a piston in said cylinder; external fluid-pressure supply connections to the other end of said cylinder; an adjustable regulating valve for controlling said supply connections; and a second, independent cylinder and piston connected to apply pressure to said clutch-means.

10. In mechanism of the class described, the combination with driving and driven members and fluid-pressure actuated clutch means adapted to operatively connect said members; of means for applying fluid-pressure to said clutch means, said pressure-applying means including a cylinder connected at one end with said clutch-means, the connections between said cylinder and clutch-means being filled with a relatively incompressible fluid; a piston in said cylinder; external fluid-pressure supply connections to the other end of said cylinder; an adjustable regulating valve for controlling said supply connections; a second, independent cylinder and piston connected to apply pressure to said clutch means; and a hand lever adapted to be operatively connected with said valve or the piston in said second cylinder, as desired.

Signed by me this 24th day of March, 1911.

JOHN R. McGIFFERT.

Attested by—
M. W. LEPP,
J. J. LUMM.